(12) United States Patent
Kim et al.

(10) Patent No.: US 7,410,723 B2
(45) Date of Patent: Aug. 12, 2008

(54) POUCH TYPE SECONDARY BATTERY

(75) Inventors: Sang-Bum Kim, Cheonan (KR); Chang-Ho Kim, Suwon (KR); Youn-Han Chang, Osan (KR)

(73) Assignee: Samsung SDI Co., Ltd., Suwon (KR)

( * ) Notice: Subject to any disclaimer, the term of this patent is extended or adjusted under 35 U.S.C. 154(b) by 602 days.

(21) Appl. No.: 10/607,140

(22) Filed: Jun. 27, 2003

(65) Prior Publication Data
US 2004/0033416 A1 Feb. 19, 2004

(30) Foreign Application Priority Data
Jun. 29, 2002 (KR) .............................. 2002-37514

(51) Int. Cl.
*H01M 2/04* (2006.01)
*H01M 2/26* (2006.01)

(52) U.S. Cl. .................. 429/175; 429/176; 429/178; 429/185; 429/211

(58) Field of Classification Search .................... None
See application file for complete search history.

(56) References Cited
U.S. PATENT DOCUMENTS 5,624,767 A * 4/1997 Muffoletto et al. ............. 429/7
6,190,794 B1 * 2/2001 Wyser ........................... 429/94
6,232,015 B1 * 5/2001 Wyser .......................... 429/176
6,444,351 B1 * 9/2002 Goto ............................ 429/94
6,586,134 B2 * 7/2003 Skoumpris ................. 429/178
6,743,546 B1 * 6/2004 Kaneda et al. .............. 429/127

FOREIGN PATENT DOCUMENTS
KR 1999-006549 2/1999
KR 10-2001-0017194 3/2001

* cited by examiner

*Primary Examiner*—John S. Maples
(74) *Attorney, Agent, or Firm*—H.C. Park & Associates, PLC

(57) ABSTRACT

A battery has enhanced reliability by protecting the battery from external impacts by separately installing a reinforcement structure on a casing and an electrode assembly housed in the casing. The configuration reduces or minimizes volumetric change in the dimensions due to volumetric expansion of the electrode assembly. The battery may include an electrode assembly having first and second electrode plates with a separator interposed therebetween. First and second terminal portions extending from the first and second electrode plates and a pouch casing having an open portion and for housing the electrode assembly. A pouch cover coupled and sealed with an opening of the pouch casing. The pouch cover having at least one throughhole and at least one electrode pin fastened to the throughhole. The electrode pin is electrically connected to one of the first and second terminal portions of the electrode assembly. The first and second leads are exposed outside the pouch cover and are electrically connected to the first and second terminal portions.

13 Claims, 14 Drawing Sheets

POUCH TYPE SECONDARY BATTERY

BACKGROUND OF THE INVENTION

1. Field of the Invention

The present invention relates to a battery, and more particularly, to a secondary battery with a pouch casing having an improved reinforcement structure.

2. Discussion of the Related Art

Rechargeable secondary batteries are typically small in size and have a large storage capacity. Some examples of the batteries include nickel-metal hydride (Ni—MH) and lithium (Li) ion batteries.

Secondary batteries may be categorized as cylindrical, rectangular, and pouch type. The cylindrical batteries may use an aluminum can type structure, while the rectangular batteries typically use a rectangular aluminum can type structure. The pouch type batteries may be arranged in a thin film pouch casing.

FIG. 1 is an extracted perspective view of a pouch type secondary battery according to the related art.

Referring to FIG. 1, an electrode assembly 10 for generating a predetermined current and a pouch casing 20 for enclosing and hermetically sealing the electrode assembly 10. The electrode assembly 10 has an electrode tab 14 arranged on a side of the assembly. The electrode tab 14 is connected with a lead 15 for an electrical path to the exterior of the battery. The lead 15 has a protective tape 16 adhered to its surface and extends outside the pouch casing 20.

The pouch casing 20 includes a casing body 22. The casing body 22 has an internal space in which the electrode assembly 10 is retained. A cover 24 extends from one end of the casing body 22. A flange 23 is formed at the periphery of the casing body 22. The flange 23 may be welded with the cover 24 for creating a hermetic seal with the casing body 22. The pouch casing 20 is made of metal and resin materials in the form of a foil material.

FIG. 2 is a cross-sectional view taken along the line I-I of FIG. 1 according to the related art.

Referring to FIG. 2, the pouch casing 20 is formed of compressed composite materials. For example, a laminate structure of a thermal adhesion layer 22b, a foil layer 22a, another thermal adhesion layer 22b, and a sheathing layer 22c. The thermal adhesion layer 22b may be formed of denatured polypropylene, for example, cast polypropylene (CPP). The foil 22a may be made of a metal, for example, aluminum (Al). The sheathing 22c may be formed of a polymer resin, for example, nylon or polyethyleneterephthalate (PET). The pouch casing 20 may be sealed via heat compression, thereby joining the thermal adhesion layers of the casing body 22 and the pouch cover 24.

The above-described configuration is very thin and provides a poor protection for the electrode assembly housed in the pouch casing 20. In particular, the metal foil used for maintaining the strength of the casing is only several tens of microns thick. Accordingly, it is very weak against external impacts.

Also, the safety and reliability of the battery may be impaired if the related art pouch is disturbed.

The melting point of the thermal adhesion layer (e.g., made of CPP) of the related art pouch is about 130 to 140° C. The melting point of the electrode assembly housed in the pouch casing is also about 130 to 140° C. The temperature required to thermally weld or seal the casing body and pouch cover is about 180 to 210° C. Accordingly, during the welding of the pouch the thermal adhesion layer and the separator may melt. Also, the separator may be fixed to the thermal adhesion layer due to the high temperatures. If the thermal adhesion layer melts the Al metal film inside may be exposed, and thus creating short circuit of the electrode assembly.

FIG. 3 is a cross-sectional view illustrating a bi-cell stacked structure of an electrode assembly according to the related art.

Referring to FIG. 3, illustrating a laminate construction of positive electrode sheets 11 and negative electrode sheets 12 separated by separators 13. That is, a laminate of having a positive electrode sheet 11, a separator sheet 13, a negative electrode sheet 12, another separator sheet 13, and another positive electrode sheet. The area of each of the separator sheets 13 is greater than the area of the individual positive electrode sheet 11 and negative electrode sheet 12. Additionally, the area of the positive electrode sheets 11 is the smallest. The sheets are arranged to form the electrode assembly 10.

A swelling phenomenon occurs inside the electrode assembly 10. That is, gas may be generated inside the battery as the battery is repeatedly charged and discharged, thereby the electrode sheets may swell in the direction of the arrows as shown in FIG. 3. Additionally, the separator sheets 13 may shrink compounding the problem. As a result the positive electrode sheet 11 and the negative electrode sheet 12 may become short circuited with each other at edges.

Related art solutions to protect the battery from short circuits will be described in the following.

By way of example, U.S. Pat. No. 6,042,966 discloses a battery structure for preventing electrical shorts between an electrode tab and an edge of a pouch. The pouch includes an outer lamination layer made of a packaging insulator film, a metal foil layer, and an inner lamination layer having a polyamide layer. The inner lamination layer includes, for example, nylon, and a thermal adhesion layer sequentially formed on the inner face of the metal foil.

U.S. Pat. No. 6,106,973 discloses a pouch formed by folding a laminated film including an aluminum (Al) film at the inner side and a polypropylene film at the outer side and arranged on both sides of an electrode assembly.

The above-described battery pouches have several drawbacks including poor structural stability. Also, a stacked electrode assembly may cause a short circuit between electrodes.

Accordingly, there is a need for battery apparatus that has good structural stability and one that minimizes shorting. The present invention obviates one or more of the problems associated with related art.

SUMMARY OF THE INVENTION

Accordingly, the present invention is directed to a pouch type secondary battery that substantially obviates one or more of the problems due to limitations and disadvantages of the related art.

An advantage of the invention is to provide a battery of enhanced reliability and safety. The battery is protected from external impacts with reinforcement structures on an electrode assembly arranged inside a pouch casing.

Another advantage of the invention is to provide a pouch type secondary battery having enhanced reliability by reducing a change in external dimension due to volumetric expansion of an electrode assembly.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an aspect of the present invention, there is provided a pouch type secondary battery including an electrode assembly having a first electrode plate and a second electrode plate with a separator interposed therebetween. A first terminal portion and a second terminal portion extend from the first electrode plate and the second electrode plate. A pouch casing in which the electrode assembly is arranged has an open portion. A pouch cover including metal is coupled to and sealed with the open portion of the pouch casing. At least one throughhole and at least one electrode pin are fastened to the throughholes. The electrode pin is electrically connected to one of the first terminal portion and the second terminal portion of the electrode assembly. The first lead and the second lead are exposed outside the pouch cover and electrically connected to the first terminal portion and the second terminal portion.

The electrode pin may be insulated from the pouch cover and connected such that the first terminal portion is electrically connected to the inner face of the pouch cover and the second terminal portion is electrically connected to the inner face of the electrode pin.

The first lead may be coupled to an outer face of the pouch cover and the second lead may be coupled to an outer face of the electrode pin and insulated from the pouch cover.

Optionally, the electrode pin may include a first electrode pin and a second electrode pin formed at locations substantially corresponding to the first terminal portion and the second terminal portion, respectively. At least one of the first electrode pin and the second electrode pin may be insulated from the pouch cover. The first terminal portion and the second terminal portion may be electrically connected to the inner face of the first electrode pin and the second electrode pin, respectively.

The first lead and the second lead may be coupled to an outer face of the first electrode pin and the second electrode pin, respectively. At least one of the first lead and the second lead are insulated from the pouch cover.

The metal may include a steel with a coating on its surface. The steel may be stainless steel.

A reinforcement member may be coupled to at least one side of the electrode assembly.

An insulating terminal cover may be used for protecting the electrodes. The cover includes insertion holes for receiving the first terminal portion and the second terminal portion.

In accordance with another aspect of the present invention, there is provided a pouch type secondary battery including an electrode assembly having a first electrode plate and a second electrode plate with a separator interposed therebetween, and a first terminal portion and a second terminal portion extending from the first electrode plate and the second electrode plate. A pouch casing for housing the electrode assembly having an open portion. A pouch cover is formed of an insulating reinforced foil and coupled and sealing the open portion of the pouch casing. The pouch cover includes a first throughhole and a second throughhole at locations substantially corresponding to the first terminal portion and the second terminal portion, respectively. A first electrode pin and a second electrode pin may be fastened to the first throughhole and the second throughhole, respectively. The first terminal portion and the second terminal portion of the electrode assembly is electrically connected to an inner face of the first electrode pin and the second electrode pin. A first lead and a second lead electrically connected to an outer face of the first electrode pin and the second electrode pin, respectively.

A reinforcement member may be arranged on at least a portion of the electrode assembly.

An insulating terminal cover may be used for protecting the electrodes. The cover includes insertion holes for receiving the first terminal portion and the second terminal portion.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to embodiments of the present invention, examples of which are illustrated in the accompanying drawings.

Figure 4:
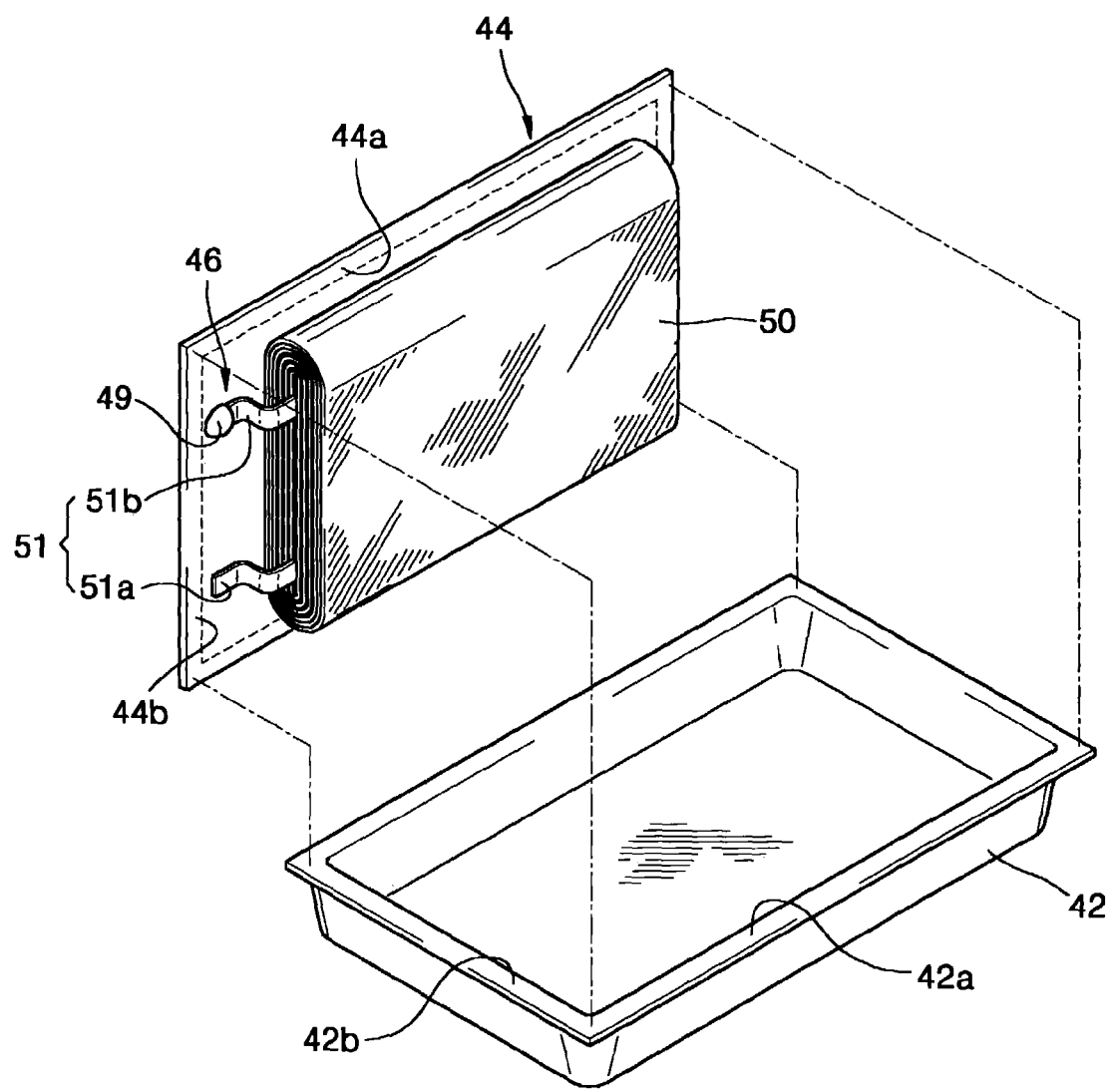
FIG. 4 illustrates a partially disassembled perspective view of a pouch type secondary battery according to an embodiment of the present invention.
Figure 5:
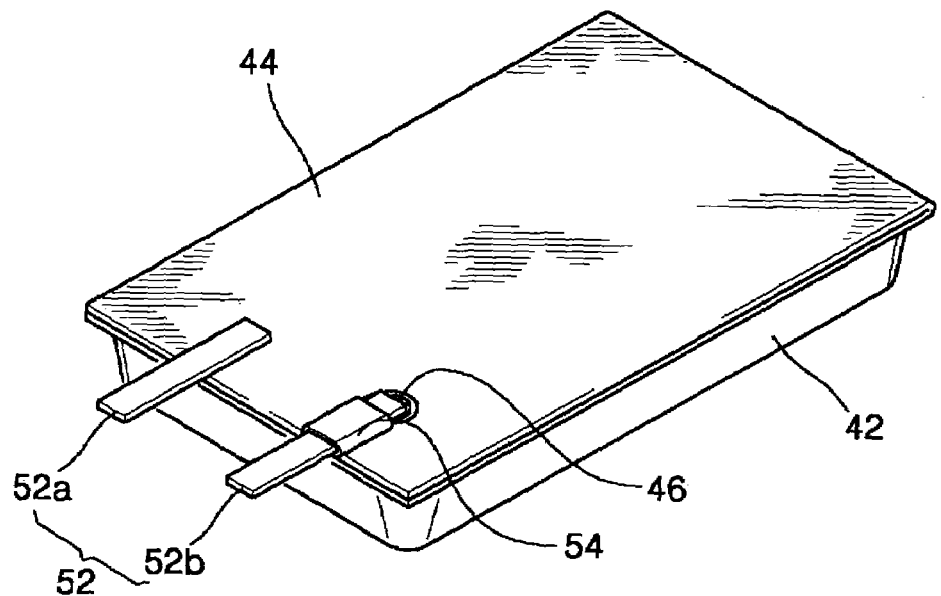
FIG. 5 illustrates a perspective view of a pouch type secondary battery according to an embodiment of the present invention.

FIG. 4 illustrates a partially disassembled perspective view of a pouch type secondary battery according to an embodiment of the present invention. FIG. 5 illustrates a perspective view of a pouch type secondary battery according to an embodiment of the present invention. Referring to FIGS. 4 and 5, including an electrode assembly 50 having a first electrode plate and a second electrode plate with a separator interposed therebetween. A pouch casing 42 for housing the electrode assembly 50 and a pouch cover 44 is coupled to and sealed via a flange 42a. Of course other configurations can be used.

In one exemplary illustration, the electrode assembly 50 may be in the form of a roll. That is, the first electrode plate and the second electrode plate may have a separator interposed between the plates and the configuration is wound into an electrode assembly 50. The electrode assembly configuration is not limited to configuration shown in FIG. 4. The electrode assembly 50 may be in the form of a stacked electrode assembly. For example, the first electrode plate and the second electrode plate may be stacked with a separator interposed between the plates. Other configurations have been contemplated and may be utilized for the electrode assembly.

The electrode assembly 50 may have a positive first electrode plate and a negative second electrode plate, or vice versa. The positive electrode plate and the negative electrode plate each include a current collector formed of metallic foil and an active material layer coated on at least one surface of each current collector.

In a lithium secondary battery configuration aluminum (Al) foil may be used as the positive electrode current collector and a copper (Cu) foil may be used as the negative electrode current collector. The active material layer for the positive electrode may include a mixture containing lithium oxide. The active material layer for the negative electrode may include a mixture containing a negative active material, such as a carbon material. The first electrode terminal portion 51a and the second electrode terminal portion 51b may extend from the first electrode plate and the second electrode plate, respectively.

The electrode assembly 50 may be housed in the pouch casing 42. The pouch casing 42 may be configured having a partial opening and having a flange 42a formed around the opening. The flange 42a may be used for coupling the pouch cover 44 together. That is, portion 44a of the pouch cover 44 may be coupled to the flange 42a of the pouch casing 42 for hermetically sealing the pouch cover 44 and the casing 42.

In embodiments of the present invention, the pouch casing 42 and the pouch cover 44 may be formed of a number of different metallic materials or the like. For example, the pouch cover 44 may be formed of stainless steel, thereby reinforcing the strength of a pouch type secondary battery. Additionally, a coating of steel or stainless steel maybe formed on the surface of the cover. Of course, other suitable materials or combination of materials can be utilized for coating and/or forming the pouch cover 44 and the pouch casing 42. For example, the pouch cover 44 and/or casing 42 may be formed of a reinforced steel material and the pouch casing 42 and/or cover 44 may be formed of a composite material, for example, aluminum (Al) foil and a resin material.

Additionally, the pouch casing 42 and cover 44 may be formed separately or integrally. That is, the pouch casing 42 and the pouch cover 44 may be integrally formed. In the case of using the same material, e.g., a reinforced steel material, the pouch casing 42 and the pouch cover 44 may be integrally formed.

Figure 7:
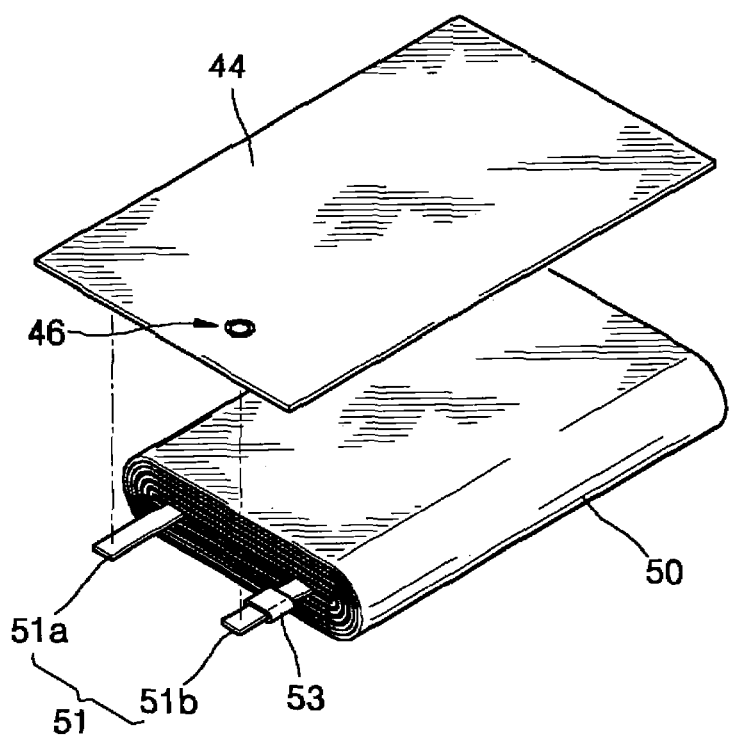
FIG. 7 illustrates a partially disassembled perspective view of a pouch cover and an electrode assembly according to an embodiment of the present invention.

Referring to FIG. 7, the pouch cover 44 is connected to the first terminal portion 51a and the second terminal portion 5b of the electrode assembly 50. The first terminal portion 5a is welded to the inner face of the pouch cover 44, which may be made of a metallic material. The second terminal portion 51b is welded to the inner face of the electrode pin 46 (penetrating the pouch cover 44), which will now be described in more detail.

Figure 6A:
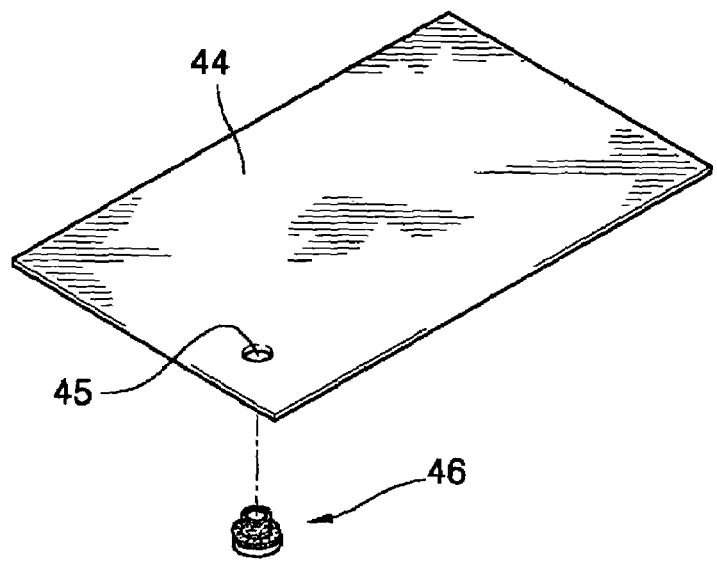
FIG. 6A illustrates a partially disassembled perspective view of a pouch cover and an electrode pin of a pouch type secondary battery according to an embodiment of the present invention.
Figure 6B:
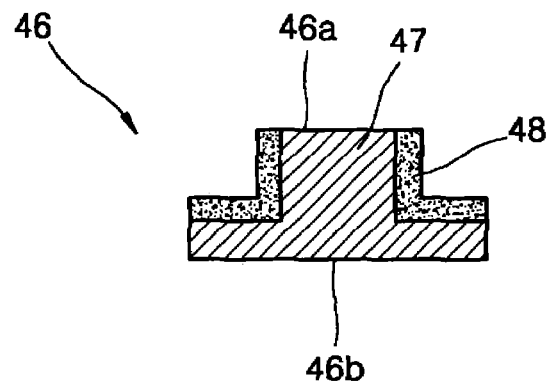
FIG. 6B illustrates a cross-sectional view illustrating an electrode pin of a pouch type secondary battery according to an embodiment of the present invention.

FIG. 6A illustrates a partially disassembled perspective view of a pouch cover and an electrode pin of a pouch type secondary battery according to an embodiment of the present invention. FIG. 6B illustrates a cross-sectional view illustrating an electrode pin of a pouch type secondary battery according to an embodiment of the present invention. Referring to FIGS. 6A and 6B, a through hole 45 penetrates the pouch cover 44, and the electrode pin 46 is fastened to the through hole 45. The electrode pin 46 may be electrically isolated from the pouch cover 44. For example, the electrode terminal portion on the inner face of the pouch cover 44 and the electrode terminal portion welded from the outer face of the pouch cover 44 are electrically connected to each other.

As shown in FIG. 6B, the electrode pin 46 includes a conducting portion 47 made of a conductive material and an insulating portion 48 for insulating the conducting portion 47 from the pouch cover 44. The conducting portion 47 may be in the shape of a two-stage cylinder. That is, having a small diameter portion 46a is inserted into the throughhole 45 of the pouch cover 44 and larger diameter portion 46b for preventing electrode pin 46 from passing through the throughhole. The insulating portion 48 may be made of any suitable insulating material and formed around the outer circumference of the throughhole 45. For example, the insulating portion 48 may be formed of denatured polypropylene, e.g., cast polypropylene (CPP), which is thermally fusible. The electrode pin 46 is inserted into the throughhole 45 of the pouch cover 44 and then heated and compressed. Accordingly, the electrode pin 46 is fasted at a location substantially corresponding to the terminal portion welded thereto.

Referring to FIG. 7, the electrode assembly 50 is connected to the inner face of the pouch cover 44 having the electrode pin 46. The first terminal portion 51a of the electrode assembly 50 may be connected to the inner face of the pouch cover 44 and the second terminal portion 51b may be connected to the electrode pin 46 of the pouch cover 44 for an electrical connection. The first terminal portion 51a and the second terminal portion 51b may be electrically connected by any suitable welding technique. For example, the first terminal portion 51a may be connected to the inner face of the pouch cover 44 by a resistive welding technique, and the second terminal portion 51b may be connected to the electrode pin 46 of the pouch cover 44 by an ultrasonic welding technique.

Figure 8A:
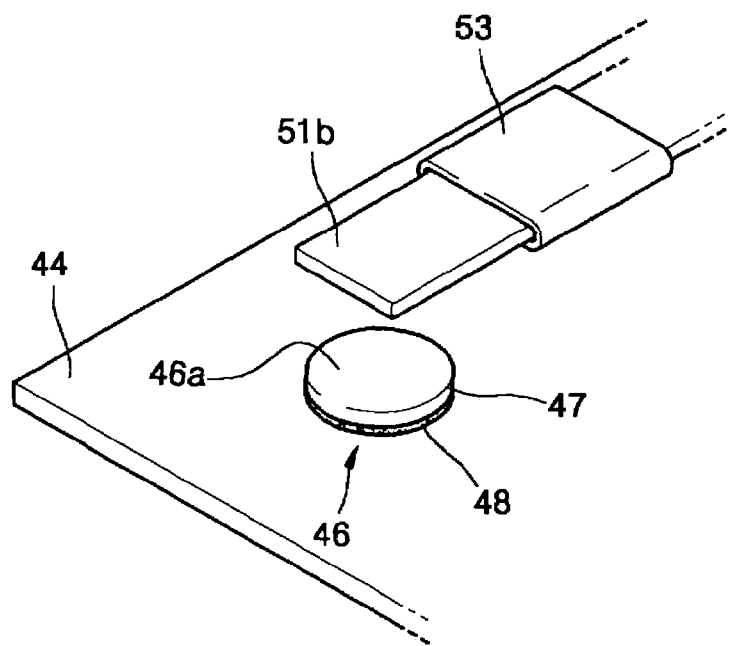
FIGS. 8A and 8B illustrate the state in which an electrode terminal is connected to the inner face of an electrode pin shown in FIG. 7.
Figure 8B:
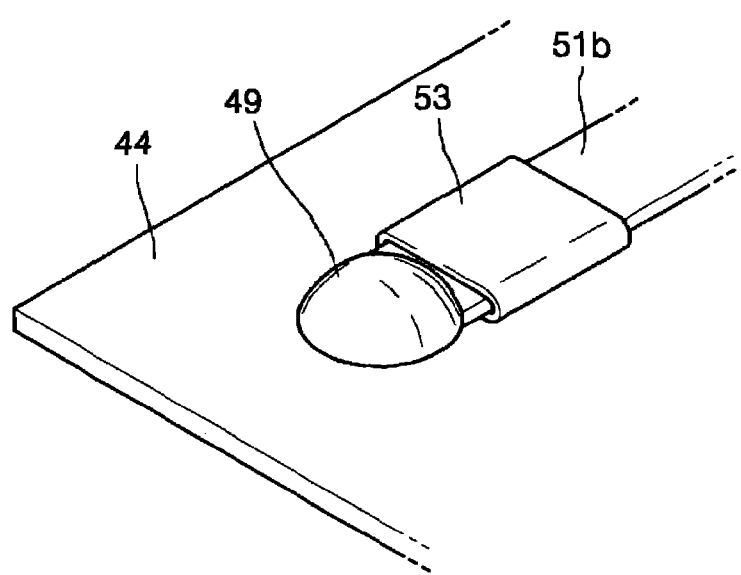

Referring to FIG. 8A, the second terminal portion 51b may be welded to the inner face of the electrode pin 46, that is, to the conducting portion 47 of the electrode pin 46. As previously explained, the conducting portion 47 is isolated from the pouch cover 44 by an insulating portion 48. After welding, a protecting portion 49 may be formed to cover the attached second terminal portion 51b, as shown in FIG. 8B. The protecting portion 49 may be formed with a coating of a polymeric insulating material or any other suitable material for preventing the second terminal portion 51b from being short circuited. Additionally, an insulating tape 53 may be further provided at the second terminal portion 51b for further preventing a short circuit.

The electrode assembly 50 is housed in the pouch casing 42 and coupled to the pouch cover 44 as shown in FIG. 4. The pouch casing 42 and the pouch cover 44 are coupled to each other. That is, the flange 42a of the pouch casing 42 and the coupling portion 44a of the pouch cover 44 are coupled to each other. For example, the flange 42a and the coupling portion 44a are welded to each other. Alternatively, the flange 42a and the coupling portion 44a may be coupled to each other using a refractory adhesive agent or by any other suitable method.

For example, the flange 42a and the coupling portion 44a are coupled to each other at every part except a front part 42b of the flange 42a and a front part 44b of the coupling portion 44a. An electrolyte injection nozzle is inserted into a gap between the front parts 42b and 44b for electrolyte injection. After electrolyte injection, the resultant structure is stored in a vacuum chamber for a predetermined time for sufficiently impregnating the electrode plates. Additionally, the electrolyte may be injected by separately forming a concave orifice for electrolyte injection at the respective front parts of the flange 42a and coupling portion 44a.

After electrolyte injection, the front parts 42b and 44b are coupled to each other by welding, using a refractory adhesive agent or other suitable method. An electrode lead portion 52 including a first lead 52a and a second lead 52b extending outwardly with respect to the pouch cover 44 are then formed as shown in FIG. 5. The first lead 52a and the second lead 52b are electrically connected to the first terminal portion 51a and the second terminal portion 51b as shown in FIG. 4.

For example, the first lead 52a is coupled to the outer face of the pouch cover 44 and the second lead 52b is coupled to the outer face of the electrode pin 46 fastened to the pouch cover 44. Accordingly, the first lead 52a is electrically connected to the first terminal portion 51a, which is coupled to the pouch cover 44. The second lead 52b is electrically connected to the second terminal portion 51b, which is coupled to the electrode pin 46. Therefore, if the first terminal portion 51a has a positive polarity the pouch cover 44 with the first terminal portion 51a coupled thereto exhibits a positive polarity and the first lead 52a exhibits a positive polarity. If the second terminal portion 51b exhibits a negative polarity the second terminal portion 52b connected to the electrode pin 46 exhibits a negative polarity, and vice versa.

In the above-described embodiments, it is necessary to isolate the second lead 52b from the pouch cover 44. For isolation, an insulating tape 54 may be attached to the second lead 52b, as shown in FIG. 5. An insulating tape may be attached to a pouch cover portion contacting the second lead 52b. Of course other suitable electrical isolating techniques may be employed. After the assembly, a connected portion of the pouch cover 44 and the pouch casing 42 is bent to be inserted into an outer casing to be used.

Figure 9:
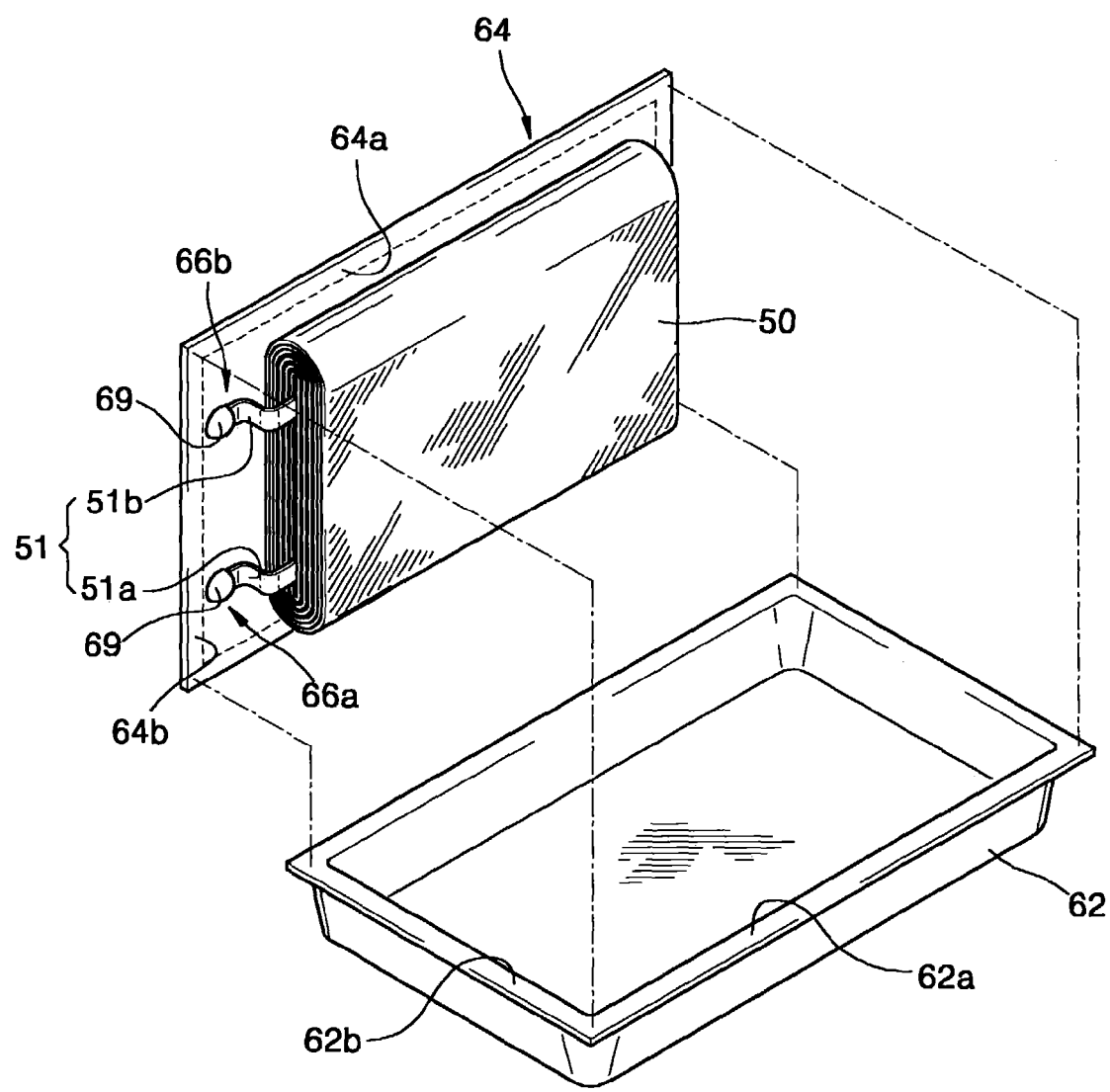
FIG. 9 illustrates a partially disassembled perspective view of a pouch type secondary battery according to another embodiment of the present invention.
Figure 10:
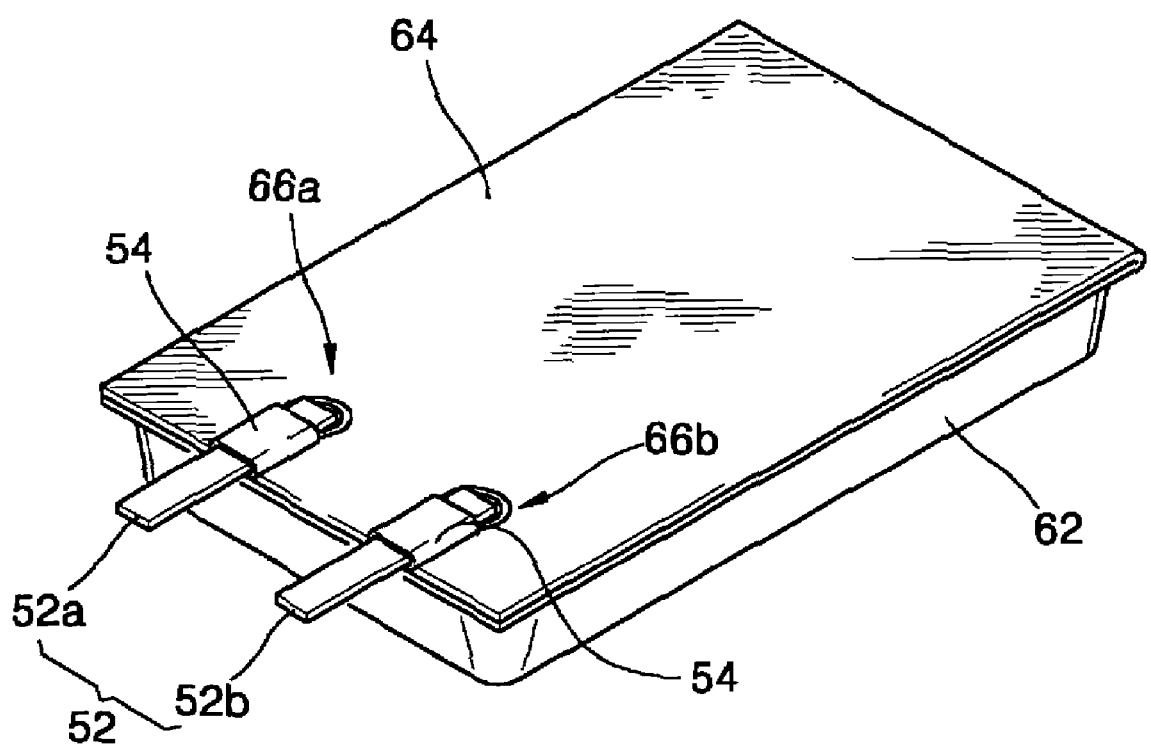
FIG. 10 illustrates a perspective view of a pouch type secondary battery according to another embodiment of the present invention.

FIGS. 9 and 10 represent a pouch type secondary battery according to another embodiment of the present invention with a configuration such that the first terminal portion 51a and the second terminal portion 51b are commonly connected to an electrode lead portion outside a pouch cover via an electrode pin.

Referring to FIG. 9, a pouch cover 64 made of a reinforced metallic material includes a first electrode pin 66a and a second electrode pin 66b formed at portions corresponding to the first terminal portion 51a and the second terminal portion 51b. The first terminal portion 51a and the second terminal portion 51b are coupled to the first electrode pin 66a and the second electrode pin 66b, respectively. A protecting portion 69 is formed on the outer face of each of the first terminal portion 51a and the second terminal portion 51b with an insulating polymer, insulating tape, or any other suitable insulating material. Although not shown, an insulating tape may be further provided at the first terminal portion 51a and the second terminal portion 51b for isolating the terminals from the metallic pouch cover 64. Additionally, the protecting portion 69 may be formed at only one of the terminal portions and only one of the protecting portions 69 is need to prevent a short-circuit. The configuration of the connection of the first electrode pin and the second electrode pin are the same as described in the above embodiments.

Additionally, the pouch cover 64 is sealed with the pouch casing 62 as described in detail above. The first lead 52a and the second lead 52b are attached outwardly with respect to the pouch cover 64 and as shown in FIG. 10. The first lead 52a is coupled to a first electrode pin 66a and the second lead 52b is coupled to a second electrode pin 66b. An insulating tape 54 may be attached to each of the first lead 52a and the second lead 52b. Additionally, the insulating tape 54 may be attached to a pouch cover portion contacting the first lead 52a and the second lead 52b. Of course any number of electrical insulating methods may be utilized. Alternatively, the insulating tape 54 may be attached to only one of the first lead 52a and the second lead 52b so as to electrically insulate only one electrode lead portion from the pouch cover 64.

It is also contemplated by the present invention that any other suitable material for the pouch cover can be utilized. For example, the pouch cover and/or casing may be formed of a metallic foil coated with an insulating resin material, a foil made of a fiber reinforced resin material, a foil made of a hard insulating polymer, metal-resin composite material, and the like.

In the case of forming the pouch cover of an insulating reinforced foil, the first terminal portion 51a and the second terminal portion 51b of the electrode assembly 50 may be coupled to the first electrode pin 66a and the second electrode pin 66b. That is, the terminal portions are fastened so as to penetrate the pouch cover 64. Next, the pouch cover 64 is sealed with the pouch casing 62, as shown in FIGS. 9 and 10. As the first terminal portion 51a and the second terminal portion 51b are not electrically connected to the pouch cover 64, a separate protective element is not necessary. However, it may be optionally formed.

The above described pouch type secondary battery increases the strength of a pouch cover and thereby enhancing the safety of the battery against external impacts.

Additionally, separate reinforcement members may be further provided in an electrode assembly. These reinforcement members will now be described in more detail.

Figure 11A:
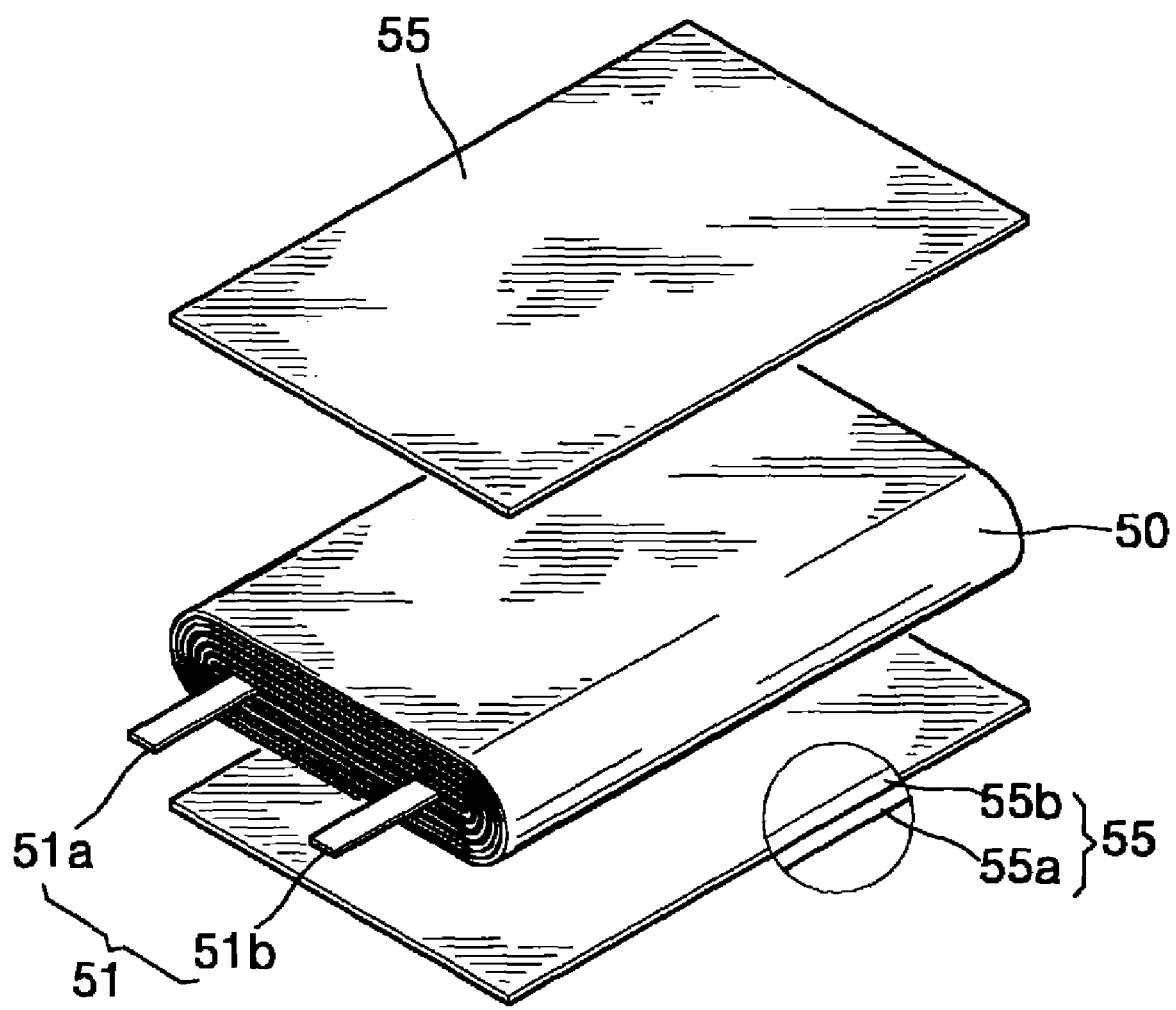
FIGS. 11A through 11C illustrate the state in which a plate-shaped reinforcement member is tightly arranged on an electrode assembly according to another embodiment of the present invention.
Figure 11B:
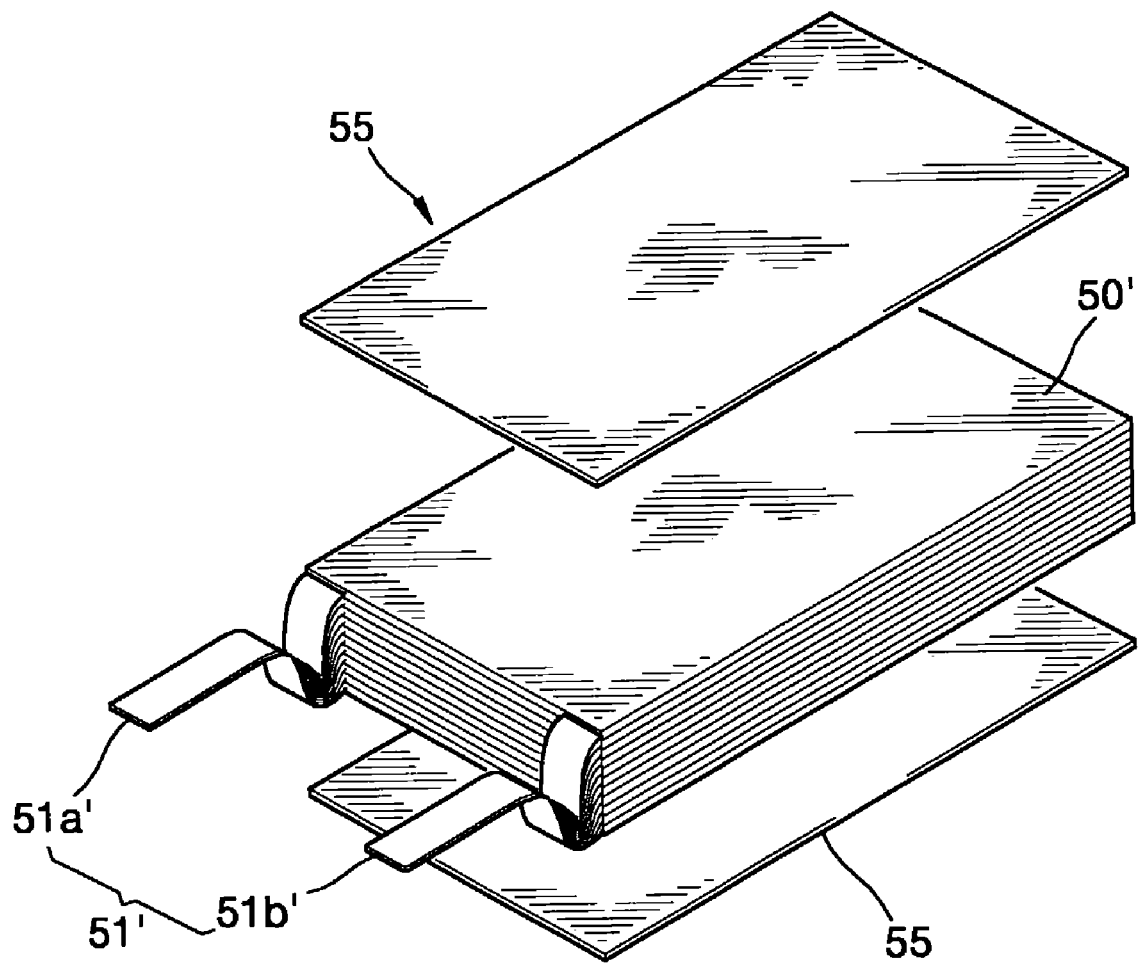
Figure 11C:
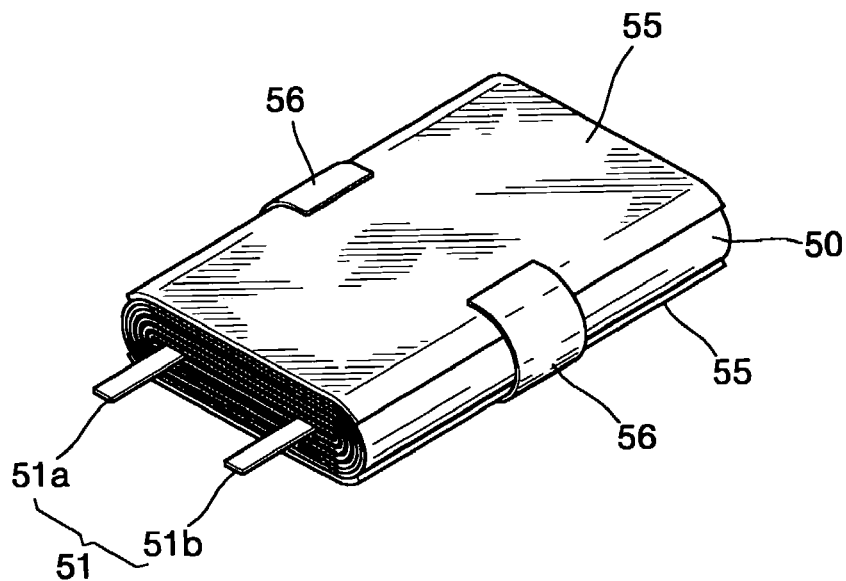

FIGS. 11A through 11C illustrate the state in which a plate-shaped reinforcement member is tightly arranged on an electrode assembly according to another embodiment of the present invention.

Referring to FIG. 11A, the electrode assembly may be in the form of a wound electrode assembly 50. That is, an electrode assembly 50 may be formed by winding a structure having a separator interposed between a first electrode plate and a second electrode plate. The first terminal portion 51a and the second terminal portion 51b extend from the respective electrode plates at one side of the wound electrode assembly 50.

Referring to FIG. 11B, the electrode assembly may be in the form of a stacked electrode assembly 50'. The stacked electrode assembly 50' may be formed of a plurality of bi-cell laminates having a separator interposed between the electrode plates. The electrode terminal portions 51a' and 51b' may extend from the respective electrode plates at one side of the stacked electrode assembly 50'. The electrode terminal portions 51a' and 51b' having the same polarity are welded to each other. Reinforcement member may be closely adhered to or arranged on portions of the stacked and wound electrode assemblies.

Referring to FIG. 11A, the electrode assembly 50 has a reinforcement member 55 arranged on at least one side. In this exemplary illustration, the reinforcement member 55 may have panel shape and be closely adhered to the top portion and the bottom portion of the electrode assembly 50. The reinforcement member 55 may include an insulating material, reinforced foil 55a, and an adhesive resin material 55b formed on an opposite side of the insulating foil 55a and facing the electrode assembly 50. The adhesive resin material 55b may include CCP, or may be formed by laminating an adhesive resin film on the insulating foil 55a, coating an adhesive resin material, or any other suitable technique. Additionally, the adhesive resin layer 55b may be formed on the other plane of the insulating foil 55a.

The reinforcement member 55 may be formed of a fiber reinforced resin material, an insulating polymer, an insulating tape adhered to at least one plane of the electrode assembly 50, and any other suitable material. The reinforcement member 55 may be closely arranged on electrode assembly 50 in a plurality of manners.

For Example, as illustrated in FIGS. 11A and 11B thermal compression may be employed to arrange the reinforcement member 55 on the electrode assemblies. Optionally, as shown in FIG. 11C an insulating tape 56 may be used for adhering the reinforcement member 55 to the electrode assembly 50.

As shown in FIGS. 11A and 11B, the reinforcement member may be formed by coating an adhesive resin material on at least one side of an insulating foil. Also, it may be formed of a fiber reinforced resin material. In the latter case, the reinforcement member may be subjected to thermal compression after the inner surface is coated with an adhesive resin material.

Figure 12A:
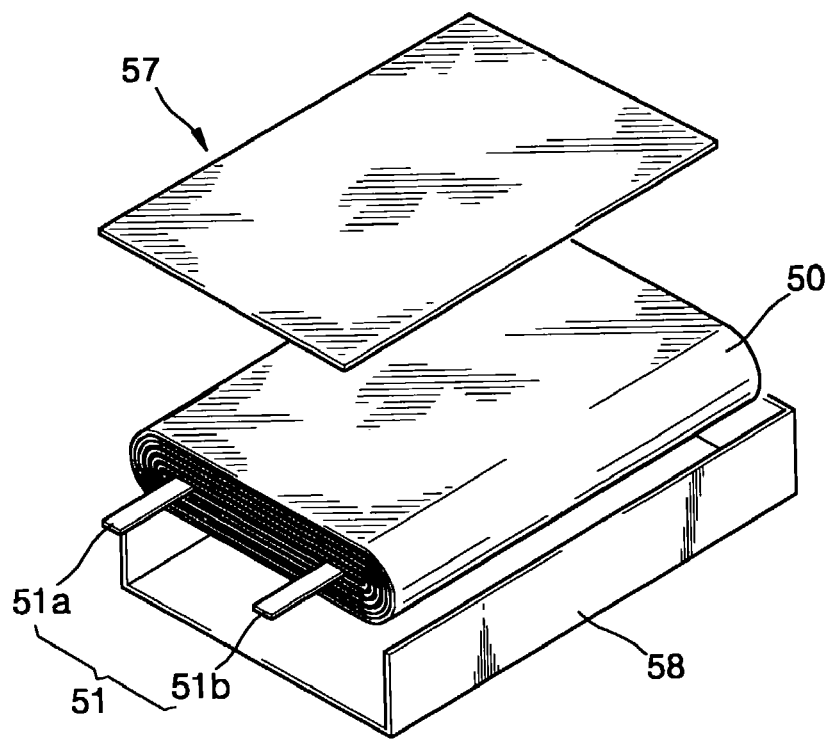
FIGS. 12A and 12B illustrate the state in which a reinforcement member is tightly arranged on an electrode assembly according to another embodiment of the present invention.
Figure 12B:
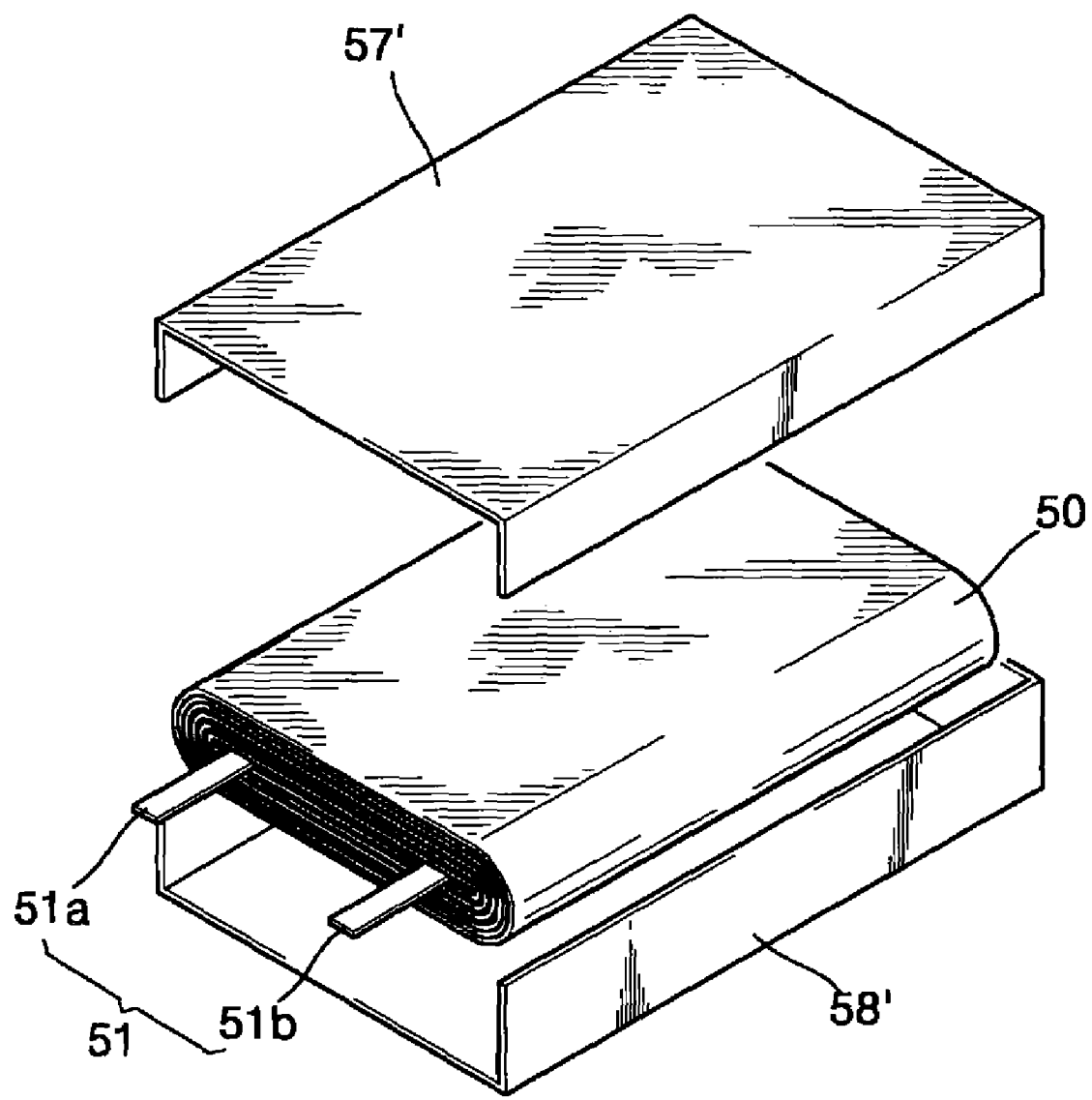

Referring to FIGS. 12A and 12B, the reinforcement member may be formed on lateral surfaces of the electrode assembly 50. For example, a lower reinforcement member 58 may be formed so as to be arranged on the bottom, lateral and rear planes of the electrode assembly 50, while an upper reinforcement member 57' is formed and arranged on top portion of the electrode assembly 50. The reinforcement members may be thermally compressed with the electrode assembly 50. Optionally, an insulating tape may be wrapped around the electrode assembly 50. Numerous other configurations and combinations of the foregoing reinforcement members and/or attaching techniques have also been contemplated. For example, the insulating tape and the side reinforcements may be used.

Referring to FIG. 12B, an upper reinforcement member 57' is arranged on the electrode assembly 50. A lower reinforcement member 58' is arranged on the electrode assembly 50. These reinforcements may be thermally compressed with the electrode assembly 50 and/or fixed via an insulating tape.

The reinforcement members may be closely adhered to at least one of the surfaces of the electrode assembly, thereby, effectively protecting the electrode assembly against external impacts. Additionally, the reinforcement members can prevent or minimize short circuits. For example, referring to FIGS. 4-5 and 9-10, the reinforcement members prevent contact between the electrode assembly and casing and/or pouch cover.

As previously described the electrode assembly is subject to becoming swollen or expanded. That is, swelling or expansion of the electrode assembly may occur during an initial charging and discharging period of a battery. The swelling of the electrode assembly can be prevented or minimized by the reinforcement members. As the reinforcement members are closely arranged on the outer surfaces of the electrode assembly, thus any change in the external dimensions are minimized or eliminated. This can obviate the disadvantages of the related art. That is, short circuits that occur at the edges of the electrode assembly due to swelling is minimized or eliminated.

Other configurations have been contemplated for preventing or minimizing volumetric expansion (e.g., swelling) of an electrode assembly and resulting short circuits. In another exemplary illustration of FIGS. 13A to 13D, a reinforcement structure is arranged on lateral portions of an electrode assembly 70 via insulating tape 75. That is, a side insulating tape 75 may be adhered to the lateral surfaces of the electrode assembly 70 for reinforcing the electrode assembly. Additionally, a rear insulating tape 76 may be adhered to the rear surface opposite to a surface where electrode terminal portions 71a and 71b are formed. It should be understood that the foregoing explanation is not intended to be limited insulating tape being adhered to the electrode assembly 70. Any number of different suitable techniques have been considered.

Figure 1:
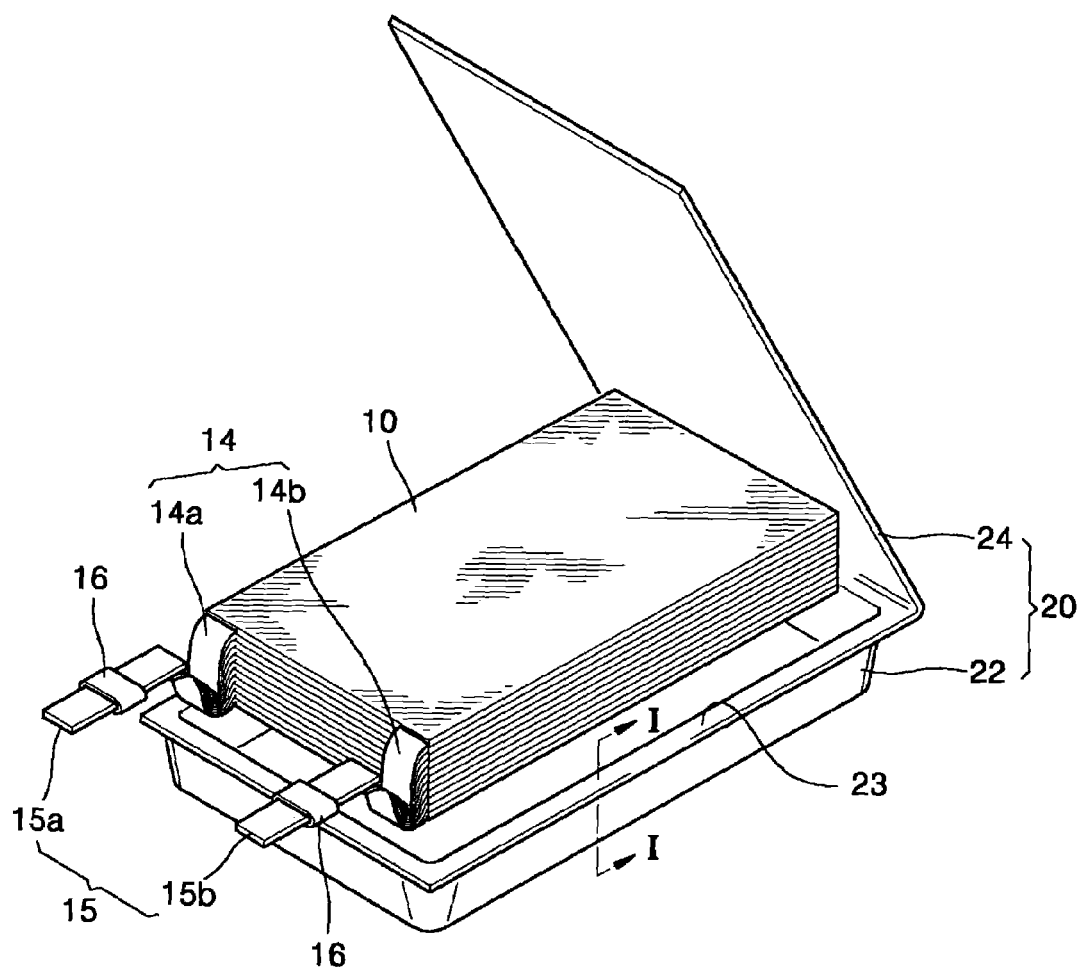
FIG. 1 illustrates an extracted perspective view of a pouch type secondary battery according to the related art.
Figure 2:
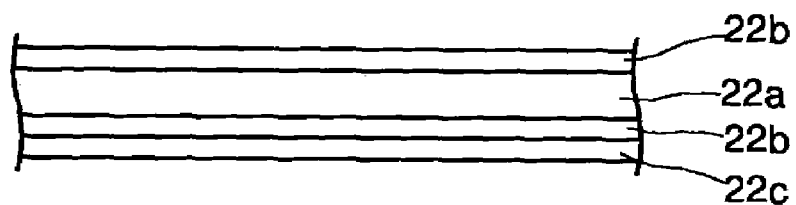
FIG. 2 illustrates a cross-sectional view showing various materials of a pouch according to the related art.
Figure 3:
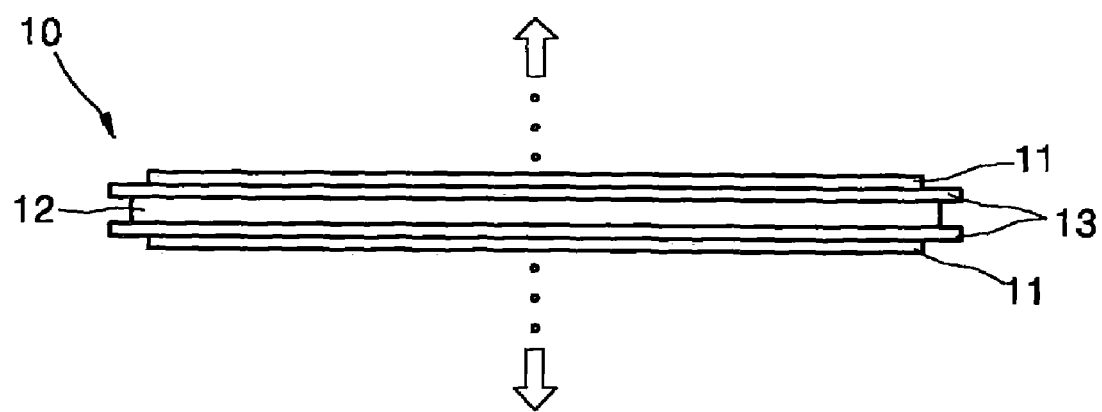
FIG. 3 illustrates a cross-sectional view of a bi-cell stacked electrode assembly according to the related art.
Figure 13A:
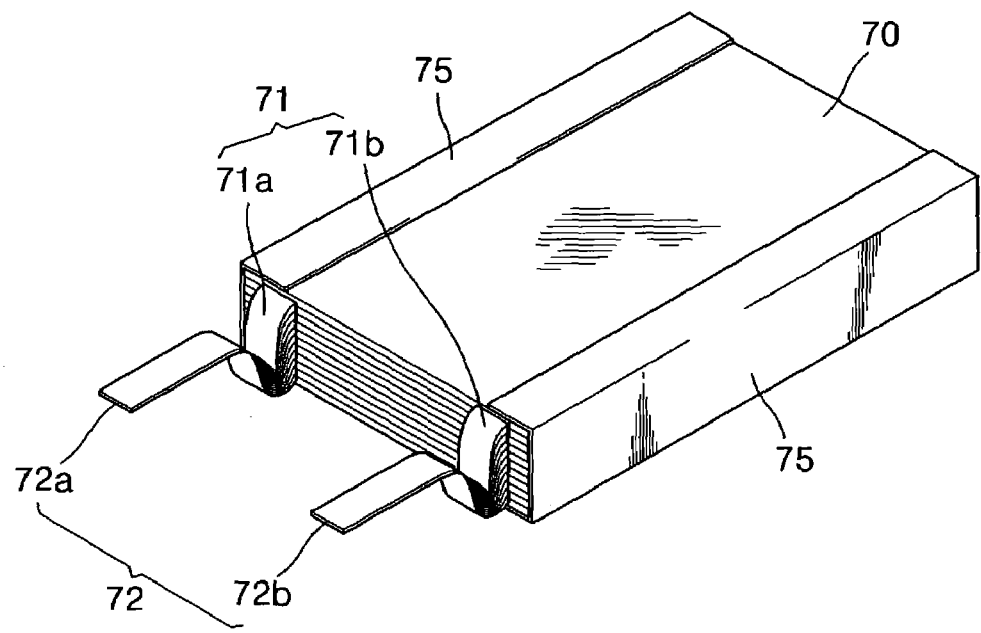
FIGS. 13A through 13D illustrate the state in which an insulating tape and optionally a terminal cover are arranged to an electrode assembly according to another embodiment of the present invention.
Figure 13B:
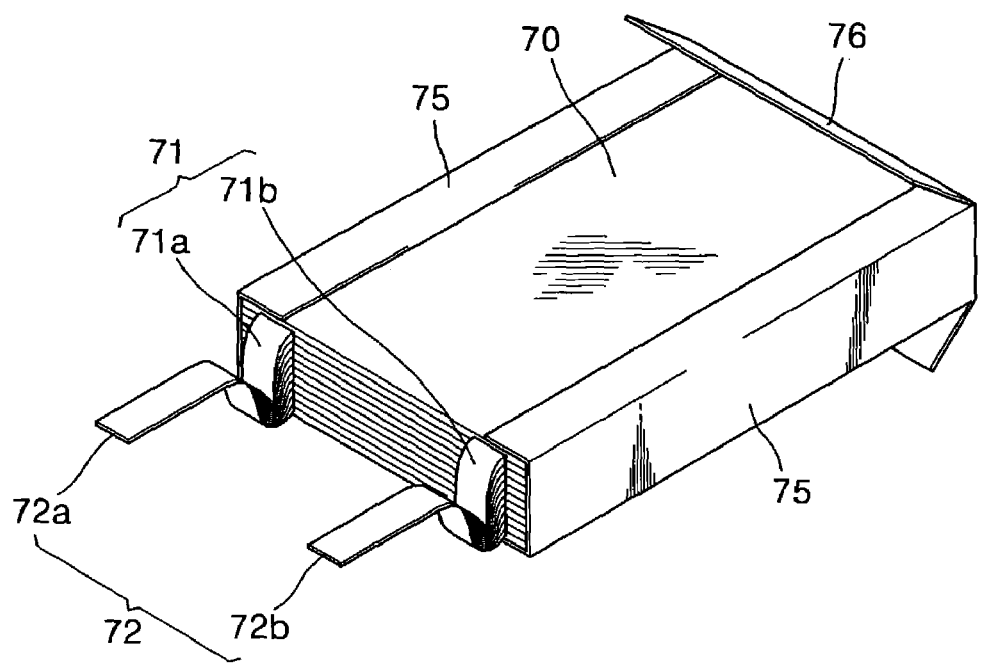

Referring to FIGS. 13A to 13B, the reinforcement structure 70 using an insulating tape 75 is adhered to lateral surfaces of the electrode assembly can be used on an stacked electrode assembly. As previously explained and shown in FIG. 3, the stacked electrode assembly is prone to short circuit occurrences, particularly at edges of positive and negative electrode plates as the electrode assembly increases due to swelling. The present invention substantially obviates these problems. For example, the shorting of the electrode assembly can be prevented by adhering an insulating tape to lateral surfaces. Also, adhering insulating tape to the lateral surface and the rear surface obviates these problems. Any combination of these reinforcement methods may be applied any type of electrode assembly. For example, the reinforcement, as described above, may be applied to a wound electrode assembly, stacked electrode assembly, or any other suitable electrode assembly for minimizing short circuits and providing a stronger assembly and thereby, preventing damage against impacts.

Figure 13C:
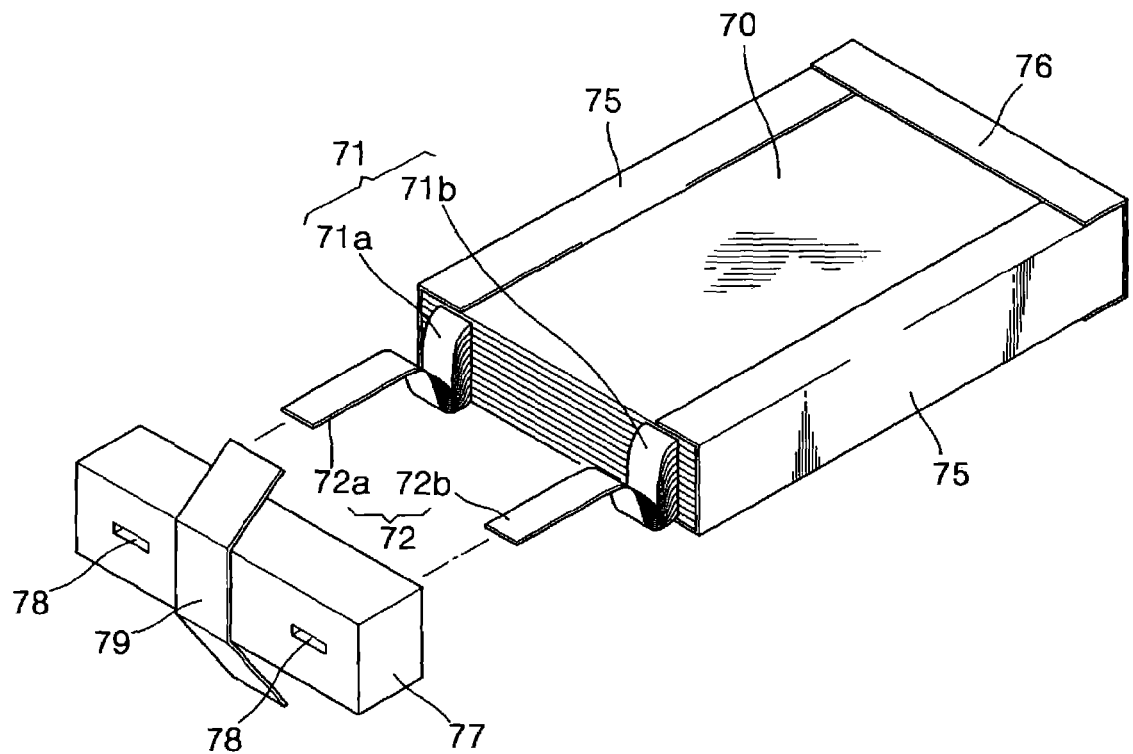
Figure 13D:
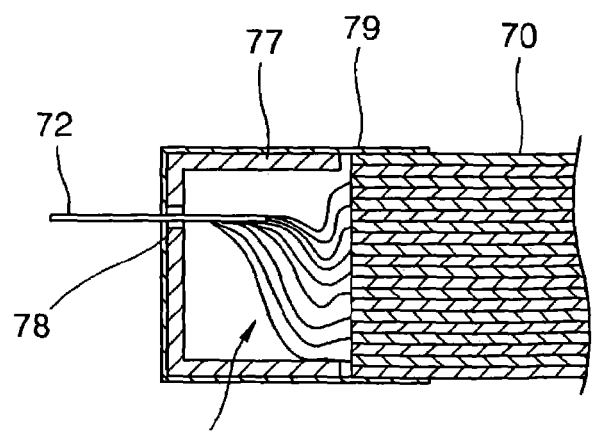

Referring to FIGS. 13C and 13D, an insulating terminal cover 77 may be connected to a side of any of the above described electrode assemblies. For example, the insulating terminal cover 77 may be connected where the electrode terminal portions 71a and 71b are formed as shown in FIG. 13D. Insertion holes 78 are formed in the cover for receiving electrode leads 72a and 72b. The cover 77 may be connected to the front portion of the electrode assembly 70 by a separate insulating tape 79 or any other suitable technique. The cover 77 protects the electrode terminal 71 from being bent and/or damaged inside the terminal cover 77. Also, the cover 77 serves as not only an insulator but also a reinforcement member. The terminal cover 77 may be applied to any kind of electrode assembly according to the present invention or any other suitable electrode assembly.

As described above, the present invention obviates the disadvantages of the related art and has a number of advantages over the related art. A few of the advantages will be described in the following.

The overall reliability and safety of a pouch type secondary battery is enhanced. Swelling and/or volumetric expansion of the electrode assembly can be suppressed. Thereby, any change in external dimension and short circuits of the electrode assembly can be minimized or eliminated.

Internal short circuits which may occur during thermal compression of a pouch casing may be prevented.

The reinforcing of the battery can be effectuated by a simple structure, thereby improving efficiencies in manufacturing of the overall structure.

While this invention has been particularly shown and described with reference to preferred embodiments thereof, it will be understood by those skilled in the art that various changes in form and details may be made therein without departing from the spirit and scope of the invention as defined by the appended claims. Accordingly, it will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A battery, comprising:
an electrode assembly including a first electrode plate and a second electrode plate with a separator interposed therebetween, a first terminal portion extending from the first electrode plate and a second terminal portion extending from the second electrode plate;
a pouch casing for housing the electrode assembly having an open portion and being formed of composite foil of a metallic material and a resin material;
a pouch cover formed of a metal material including at least one throughhole and at least an electrode pin fastened to the at least one throughhole, wherein the electrode pin is electrically connected to one of the first terminal portion and the second terminal portion and the pouch cover is coupled to and seals the open portion of the pouch casing;
a first lead and a second lead exposed outside the pouch cover, wherein the first lead is electrically connected to the first terminal portion and the second lead is electrically connected to the second terminal portion; and
wherein the electrode pin is insulated from the pouch cover and the first terminal portion is electrically connected to an inside portion of the pouch cover and the second terminal portion is electrically connected to an inside portion of the electrode pin.

2. The battery of claim 1, wherein the first lead is coupled to an outside portion of the pouch cover and the second lead is coupled to an outside portion of the electrode pin and the second lead is electrically insulated from the pouch cover.

3. The battery of claim 1, wherein the metallic material is steel with a plated layer on its surface.

4. The battery of claim 1, wherein the metallic material is stainless steel.

5. The battery of claim 1, wherein a reinforcement member is coupled to at least one side of the electrode assembly.

6. The battery of claim 1, further comprising an insulating terminal cover including insertion holes for receiving the first terminal portion and the second terminal portion.

7. The battery of claim 1, wherein the battery is a pouch type battery.

8. A battery, comprising:
an electrode assembly including a first electrode plate and a second electrode plate with a separator interposed therebetween, a first terminal portion extending from the first electrode plate and a second terminal portion extending from the second electrode plate;
a pouch casing for housing the electrode assembly having an open portion and being formed of composite foil of a metallic material and a resin material;
a pouch cover formed of a metal material including at least one throughhole and at least an electrode pin fastened to the at least one throughhole, wherein the electrode pin is electrically connected to one of the first terminal portion and the second terminal portion and the pouch cover is coupled to and seals the open portion of the pouch casing;
a first lead and a second lead exposed outside the pouch cover, wherein the first lead is electrically connected to the first terminal portion and the second lead is electrically connected to the second terminal portion;
wherein the electrode pin includes a first electrode pin and a second electrode pin formed at locations corresponding to the first terminal portion and the second terminal portion, respectively,
wherein at least one of the first electrode pin and the second electrode pin is electrically insulated from the pouch cover, and
wherein the first terminal portion is electrically connected to an inside face of the first electrode pin and the second terminal portion is electrically connected to an inside face of the second electrode pin.

9. The battery of claim 8, wherein the first lead is coupled to an outside face of the first electrode pin and the second lead is coupled to an outside face of the second electrode pin, and wherein at least one of the first lead and the second lead are electrically insulated from the pouch cover.

10. A battery, comprising:
an electrode assembly having a first electrode plate and a second electrode plate with a separator interposed therebetween, and a first terminal portion extending from the first electrode plate and a second terminal portion extending from the second electrode plate;
a pouch casing for housing the electrode assembly having an open portion and being formed of composite foil of a metallic material and a resin material;
a pouch cover formed of an insulating reinforced foil is coupled to and seals the open portion of the pouch casing, wherein the pouch cover comprises a first throughhole and a second throughhole at locations substantially corresponding to the first terminal portion and the second terminal portion, respectively, and a first electrode pin and a second electrode pin fastened to the first throughhole and the second throughhole, respectively,
wherein the first terminal portion of the electrode assembly is electrically connected to an inner face of the first electrode pin and the second terminal portion of the electrode assembly is electrically connected to an inner face of the second electrode pin; and
a first lead electrically connected to an outer face of the first electrode pin and a second lead electrically connected to an outer face of the second electrode pin.

11. The battery of claim 10, wherein a reinforcement member is arranged on least one portion of the electrode assembly.

12. The battery of claim 10, further comprising:
an insulating terminal cover including insertion holes for receiving the first terminal portion and the second terminal portion.

13. The battery of claim 10, wherein the battery is a pouch type battery.

* * * * *